United States Patent
Smith (10) Patent No.: US 10,752,335 B2
(45) Date of Patent: Aug. 25, 2020

(54) EMERGENCY RELEASE FOR PUSHOUT WINDOW EVACUATION

(71) Applicant: Bell Helicopter Textron Inc., Fort Worth, TX (US)

(72) Inventor: Michael Reaugh Smith, Colleyville, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 300 days.

(21) Appl. No.: 15/886,655

(22) Filed: Feb. 1, 2018

(65) Prior Publication Data
US 2019/0233079 A1    Aug. 1, 2019

(51) Int. Cl.
*B64C 1/32*    (2006.01)
*B64C 1/14*    (2006.01)

(52) U.S. Cl.
CPC .............. *B64C 1/32* (2013.01); *B64C 1/1492* (2013.01)

(58) Field of Classification Search
CPC ..... B64C 1/149; B64C 1/1492; B61D 19/023; Y10S 292/20; Y10S 292/66; Y10T 292/096; Y10T 292/1021; B60J 1/006; B60J 1/085
USPC .................. 49/141; 52/204.1–207.72, 127.8, 52/204.1–204.72; 105/348, 349; 182/70, 182/76; 296/146.16, 96.21
See application file for complete search history.

(56) References Cited

U.S. PATENT DOCUMENTS

| | | | | |
|---|---|---|---|---|
| 2,797,884 A * | 7/1957 | Peed, Jr. | ............... | B64C 1/1407 244/129.5 |
| 5,251,851 A * | 10/1993 | Herrmann | ............... | B64C 1/143 244/129.5 |
| 6,726,271 B2 * | 4/2004 | Stanton | ...................... | B60J 1/08 16/355 |
| 9,937,996 B2 * | 4/2018 | Joern | ..................... | B64C 1/1423 |
| 2012/0248713 A1 * | 10/2012 | Raspic | ...................... | B64C 1/14 277/630 |
| 2015/0330118 A1 * | 11/2015 | Alexander | .............. | E05B 85/10 292/200 |
| 2017/0304136 A1 * | 10/2017 | Holschuh | ............... | A61H 1/008 |
| 2018/0134366 A1 * | 5/2018 | Merkel | ................. | B64C 1/1423 |

(Continued)

OTHER PUBLICATIONS

Coleshaw, S. R. K. "Investigation of removable exits and windows for helicopter simulators," Aberdeen: OPITO (2006), 47 pages; https://www.opito.com/media/downloads/investigation-of-removable-exits-and-windows-for-helicopter-simulators.pdf.

(Continued)

*Primary Examiner* — Richard R. Green
*Assistant Examiner* — Arfan Y Sinaki
(74) *Attorney, Agent, or Firm* — Patent Capital Group (57) ABSTRACT

An emergency escape window for a rotorcraft includes a window frame, a window pane set inside the window frame, a plurality of pins connecting the window frame to the fuselage of the rotorcraft, and a release mechanism having at least one actuator connected to a respective pin and constructed to retract the pin from the window frame. The escape window can then be pivoted away and/or completely detached from the fuselage in the event of an emergency to allow occupants to safely exit the rotorcraft. The disclosure also relate to a method of operating an emergency escape window for a rotorcraft and to a rotorcraft having an emergency escape window.

18 Claims, 7 Drawing Sheets

(56) References Cited

U.S. PATENT DOCUMENTS

2019/0210708 A1\* 7/2019 Gorgoglione ......... B64C 1/1484

OTHER PUBLICATIONS

Huber, J.E, Fleck, N.A. and Ashby, M.F., Oct. 1997, "The selection of mechanical actuators based on performance indices," In Proceedings of the Royal Society of London A: Mathematical, Physical and Engineering Sciences (vol. 453, No. 1965, pp. 2185-2205), The Royal Society, 21 pages; http://www-mech.eng.cam.ac.uk/profiles/fleck/papers/85.pdf.

Johnson, A. D., and Johann Kraemer. "State-of-the-art of shape memory actuators," The Sixth UK Mechatronics Forum International Conference, Skovde, Sweden 1998, 5 pages; http://citeseerx.ist.psu.edu/viewdoc/download?doi=10.1.1.489.4926&rep=rep1&type=pdf.

\* cited by examiner

EMERGENCY RELEASE FOR PUSHOUT WINDOW EVACUATION

TECHNICAL FIELD

This disclosure relates to an emergency release for removable exits and escape windows for a rotorcraft that reduces the force to be applied to the window in the event of an evacuation of the rotorcraft in the event of an emergency, for example ditching.

BACKGROUND

Rotorcrafts typically have means of evacuation and escape that can be used in a controlled ditching or in an underwater escape following submersion or capsize. Rotorcrafts operating over water and certified for ditching are required to have at least one emergency exit above the waterline in each side of the rotorcraft, meeting at least the dimensions of a Type IV exit if carrying 9 passengers or less (a rectangular opening of at least 483 mm wide by 660 mm high (19" by 26")), with corner radii not greater than one third the width of the exit, in the side of the fuselage with a step-up inside the rotorcraft of not more than 737 mm (29"), or a Type III exit if carrying 10 passengers or more (the opening must be at least 508 mm wide by 914 mm high (20" by 36")); and the exits need not be at floor level. This Type III or IV emergency exit is likely to be the main access door if its bottom is above the waterline. In a controlled ditching accident, reports have shown that the door could be operated by a crew member or by one of the passengers. In the event of an accident involving capsize or submersion, or the waterline is above the bottom of other emergency escape openings, evidence shows that passengers are most likely to use a push-out window to escape.

Windows can be considered emergency escape exits if they meet the aforementioned minimum size requirements for an emergency exit. An escape window is a window fitting a rounded rectangular aperture with a minimum acceptable size, for example, of 483 mm×660 mm (19"×26") (depending on the number of passengers in a part 29 transport category rotorcraft) per current FAA airworthiness regulations. Regulatory requirements stipulate that the means of opening emergency exits and escape windows should be rapid, obvious and openable from inside and outside. However, sufficient force must be appliedy to ensure removal of the windows. Furthermore, emergency lighting systems should be automatically activated to illuminate push-out windows. Another safety concern relates to the high risk of disorientation following capsizing, making location and use of push-out windows difficult.

The majority of designs of emergency escape push-out windows include lanyards or beading that must be removed before the window can be pushed out. Pull-tabs are then located in many different positions. The most difficult action when operating a push-out escape window appears to be the removal of the beading around the window. Other existing art uses elastomeric beading compressed between an inner and outer frame that allows the window to be pushed in or out when sufficient force is applied at one of the corners.

It would therefore be desirable and advantageous to provide an escape push-out window assembly, in particular for a rotorcraft, which obviates the aforedescribed shortcomings and which can be dislodged from the rotorcraft with less applied force in an emergency, for example ditching the rotorcraft, while still complying with government regulatory requirements relating to the size of the window and operational safety.

SUMMARY

This disclosure relates to an escape push-out window assembly, in particular for a rotorcraft, which can be operated with a smaller applied force in the event of an emergency.

One innovative aspect of the subject matter described herein can be implemented with an emergency escape window for a rotorcraft, which includes a window frame, a window pane secured in the window frame, a plurality of pins connecting the window frame to a fuselage of the rotorcraft, and a release mechanism having at least one actuator connected to a respective pin and constructed to retract the pin from the window frame, thus allowing the escape window to be pivoted away or completely detached from the fuselage upon retraction of the at least one pin.

This, and other aspects, may include one or more of the following features. The actuator may be a shape-memory alloy (SMA) actuator that is connected to a power source, such as a battery, via one or more switches which can be actuated from inside or outside the rotorcraft in an emergency. Two pins may be non-actuatable pins arranged on an upper part of the window frame and defining a horizontal pivot axis, with each non-actuatable pin engaging in a respective opening or recess in the window frame and in a respective opening or recess the fuselage, enabling the window frame to pivot about the two non-actuatable pins about the horizontal pivot axis. The opening or recess, preferably disposed in the window frame, may be shaped as a circular arc and rest on the corresponding non-actuatable pin, which would then allow the window frame to completely detach from the fuselage part when the window frame is pivoted away from the fuselage part by a predetermined angle. In an alternative embodiment, all may be connected to respective actuators, with the release mechanism then operating to completely release the window frame from the fuselage.

Another innovative aspect of the subject matter described herein relates to a method for releasing an emergency escape window from a fuselage of a rotorcraft. The method includes attaching a window pane retained in a window frame to the fuselage with a plurality of pins, wherein at least one of the pins is an actuatable pin connected to a respective actuator for retracting the actuatable pin from the window frame; energizing the respective actuator to retract the actuatable pin; and pivoting the window frame about a horizontal pivot axis to create an emergency escape path.

A further innovative aspect of the subject matter described herein relates to a rotorcraft with a fuselage having at least one opening disposed on a side panel of the fuselage; a window frame disposed in the at least one opening; a window pane secured in the window frame; a plurality of pins securing the window frame to the fuselage; and a release mechanism having at least one actuator connected to a respective pin and constructed to retract the pin from the window frame, allowing the escape window to be pivoted away or completely detach from the fuselage upon retraction of the at least one pin.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal and regulatory constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in other than the illustrated orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Like reference numbers and designations in the various drawings indicate like elements. Moreover, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

Figure 1:
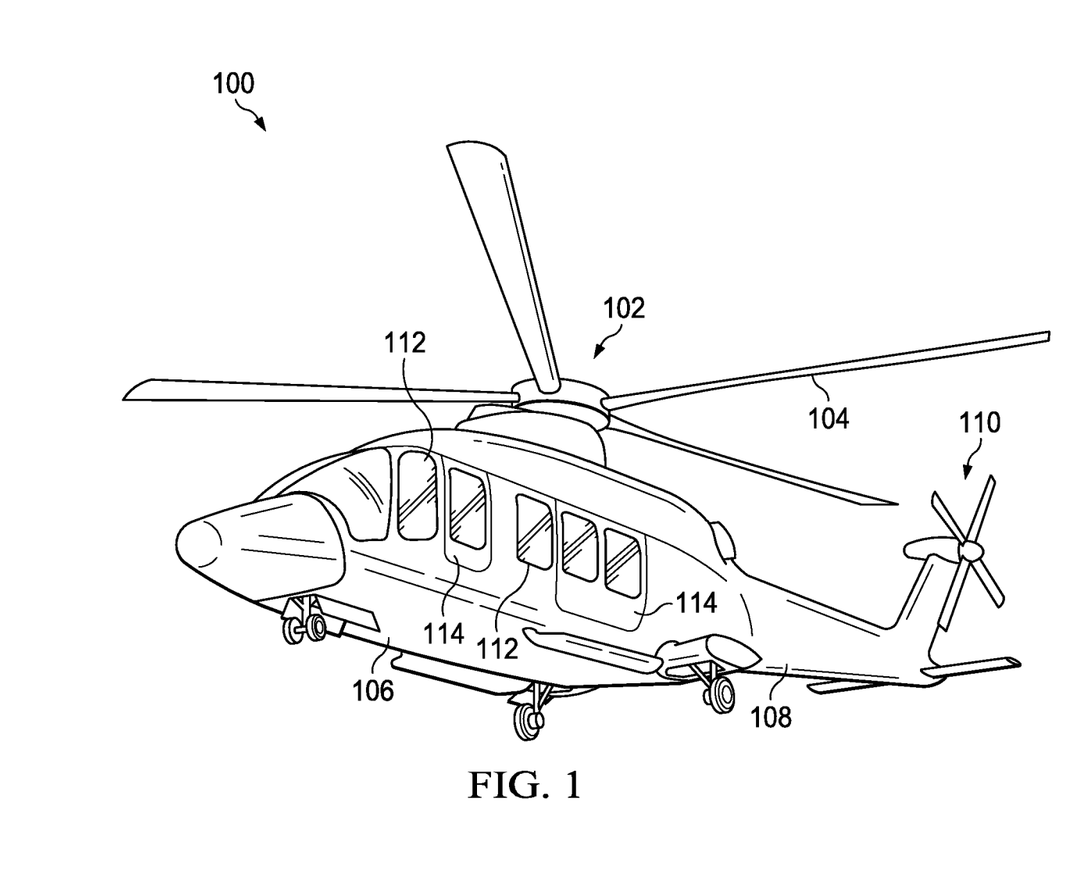
FIG. 1 illustrates an example rotorcraft in accordance with certain embodiments.

FIG. 1 illustrates an example embodiment of a rotorcraft 100. The illustrated example portrays a side view of rotorcraft 100. Rotorcraft 100 includes a rotor system 102 with a plurality of rotor blades 104. The pitch of each rotor blade 104 can be managed or adjusted in order to selectively control direction, thrust, and lift of rotorcraft 100. Rotorcraft 100 further includes a fuselage 106, a tail structure 108, and tail rotor or anti-torque system 110. In the illustrated embodiment, the fuselage 106 also includes egress doors 114 and escape windows 112 which can be used as emergency exits in an emergency, as will be described in more detail below.

It should be appreciated that rotorcraft 100 of FIG. 1 is merely illustrative of a variety of aircraft that can be used to implement embodiments of the present disclosure. Other aircraft implementations can include, for example, fixed wing airplanes, hybrid aircraft, tiltrotor aircrafts, unmanned aircraft, gyrocopters, a variety of rotorcraft configurations, and drones, among other examples. Moreover, it should be appreciated that even though aircraft are particularly well suited to implement embodiments of the present disclosure, the described embodiments can also be implemented in non-aircraft vehicles, for example railroad passenger cars, and devices.

Figure 2:
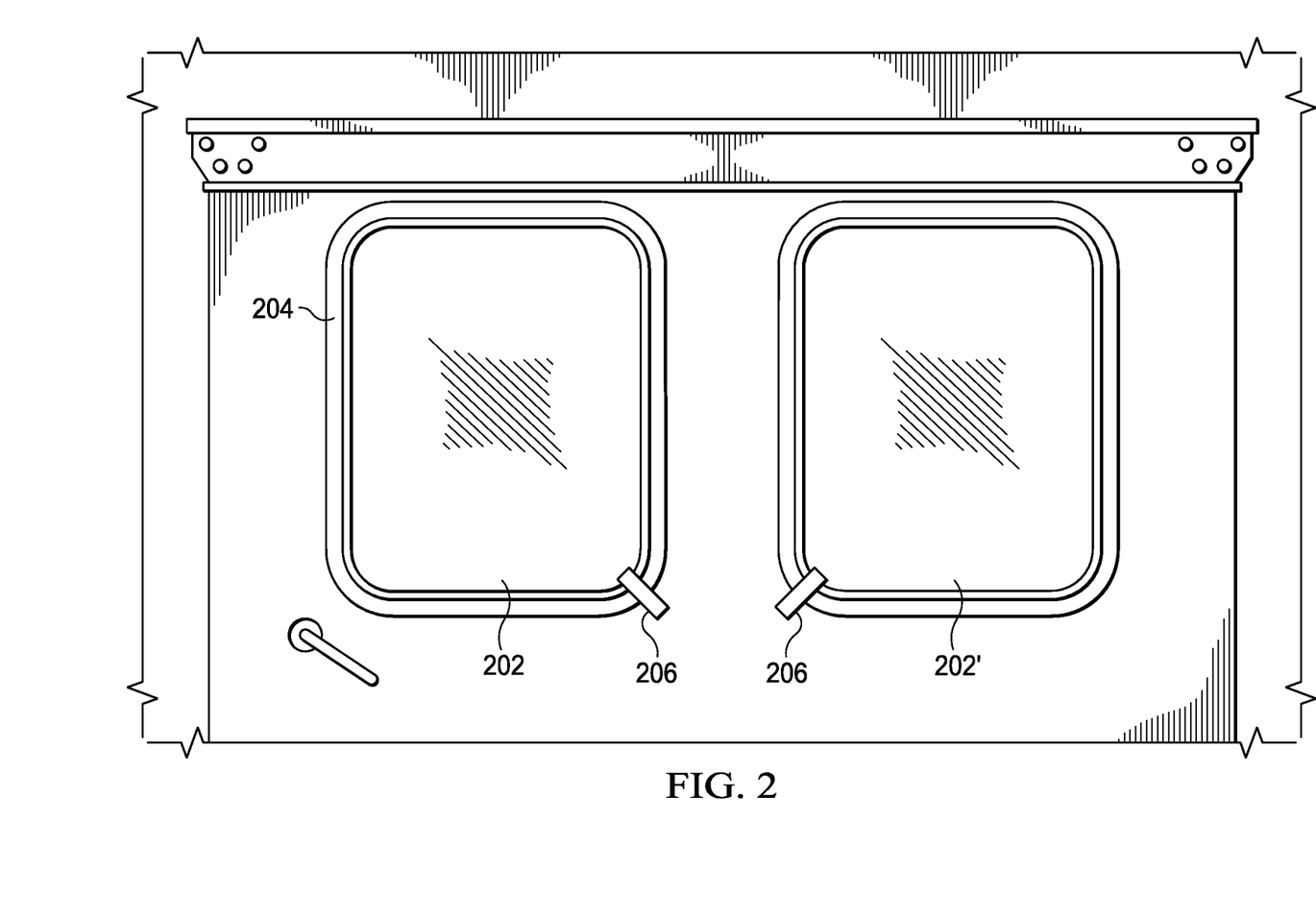
FIG. 2 is a perspective view of a conventional escape push-out window from inside the rotorcraft.

FIG. 2 shows in a perspective view from inside the rotorcraft 100 two example escape windows 202, 202' that can be used to exit the rotorcraft in the event of an emergency, such as ditching the rotorcraft. The escape windows 202, 202' are typically secured in the fuselage of the rotorcraft 100 by rubber gaskets or beading 204. Pull handles or other suitable pulling devices 206 can be attached to the rubber gaskets or beading 204 which allow occupants of the rotorcraft 100 to pull the gaskets or beading 204 out and thus release the respective window 202, 202', which then enables the occupants to escape through the thereby created escape path. However, a considerable force of 40 lbs. or more may be needed to pull or push the window 202, 202' out, which can be difficult if the aircraft is submersed and the occupant lack handholds or other structures to brace themselves against.

The embodiments described throughout this disclosure provide numerous advantages, including operation of the emergency escape windows with less applied force.

Example embodiments that may be used to implement the operation of the escape windows are described below with more particular reference to the remaining FIGURES.

Figure 3:
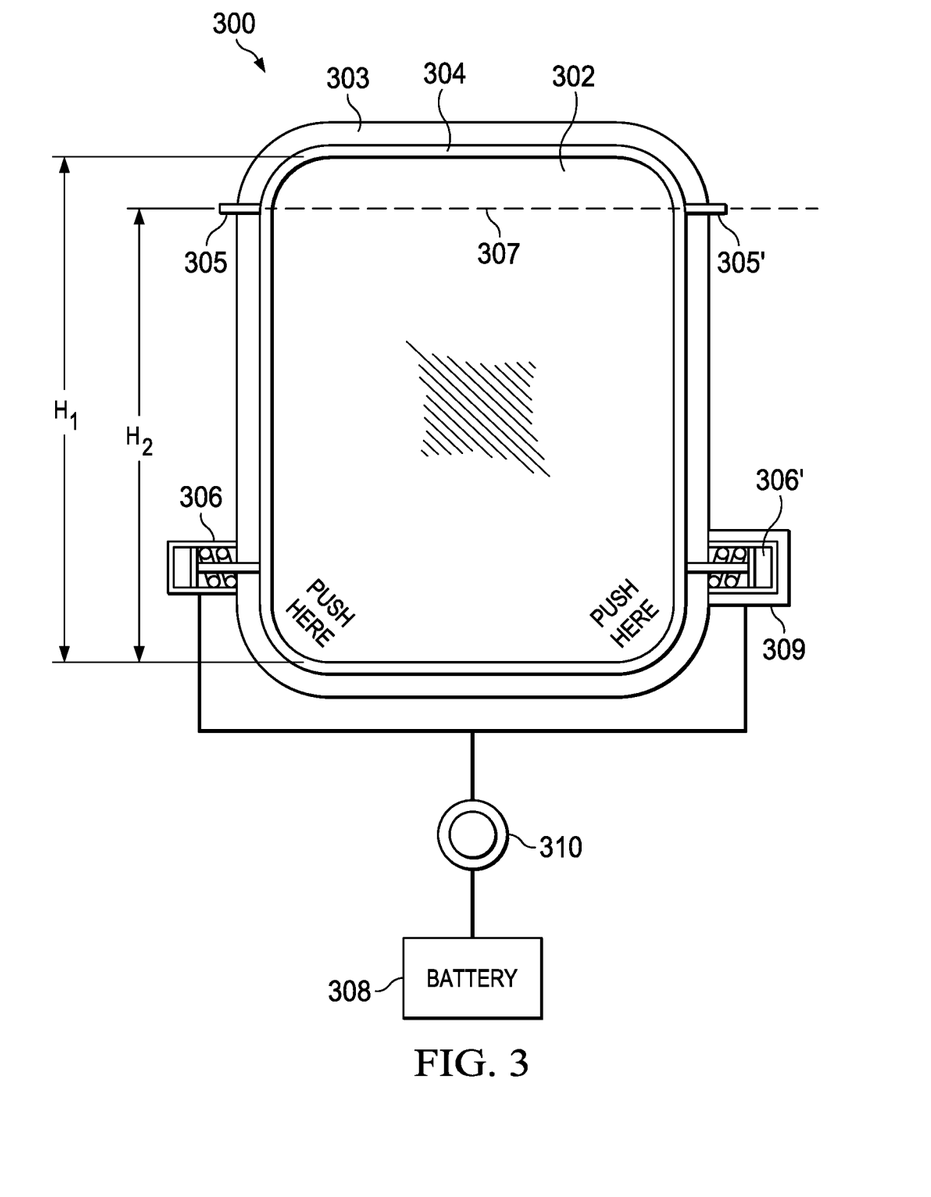
FIG. 3 illustrates a perspective view of an example escape push-out window assembly according to one embodiment of the present disclosure.

FIG. 3 illustrates schematically an example embodiment with an escape window 300 according to the present disclosure. The escape window 300 is composed of a frame 303, and a window pane 302 which is held in the frame 303 by a gasket 304 or beading 304. In other words, the escape window inside the frame may be constructed as a standard pushout window with compressed rubber ring disposed between detent troughs. The frame 303 may be secured to the fuselage 106 (FIG. 1) at four exemplary locations, namely at an upper location by pins 305, 305' attached between the frame 303 and the fuselage 106, and at a lower location by retractable pins which are part of a respective actuator 306, 306'. The actuators 306, 306' may be installed in the space between the inner and outer skin of the aircraft and are hence not directly accessible from inside or outside the aircraft. The actuators 306, 306', or the respective pins of the actuators engage with corresponding openings or recesses in the frame 303 and are configured to retract away from the frame 303 into the fuselage 106 when energized, thus allowing the frame 303 to pivot about the upper pins 305, 305'. The escape window with the frame can then be opened and ultimately pushed out either inward or outward, or in both directions. For sake of simplifying the drawings, the terms "pin" (as part of the actuator) and "actuator" may be used interchangeably in the following description.

A hinge formed by the pins 305, 305' may be constructed so that the outer window frame 303 can freely pivot about a pivot axis 307 extending through both pins 305, 305'. However, if the window frame 303 cannot be completely released from the fuselage 106, this would restrict the otherwise unobstructed height $H_1$ of the escape window 300 to a usable height $H_2$ less than $H_1$ which may be smaller than required by and may furthermore not be in compliance with government or aviation regulations. Alternatively, the unobstructed vertical height $H_1$ of the window 300 would have to be increased, which may weaken the integrity of the fuselage 106. Advantageously, the hinge formed by the pins 305, 305' may be constructed to completely release, i.e. unhook the escape window including the frame from the fuselage 106 when the window 300 pivots inward or outward by more than a predetermined angle of for example 15°. This aspect of the disclosure will be described in more detail below with reference to FIG. 7A and FIG. 7B.

The actuators 306, 306' may be energized electrically (e.g. piezoelectric), magnetically (e.g. magnetostrictive; solenoid), thermally (by thermal expansion), pneumatically or hydraulically by various mechanisms. Exemplary mechanisms and their corresponding power densities are shown schematically in the diagram of FIG. 5. Because onboard power in aircrafts is at a premium and may have to operational in the event that onboard power is lost, the performance of shape-memory-alloys (SMA) was found to be advantageous for implementation in the proposed actuators 306, 306'. For example, the actuators may be operated by self-contained battery power from a battery 308 (FIGS. 3 and 4), for example a low-voltage button cell having a submerged service life in excess of 10 years. In addition, since many windows in aircrafts and rotorcrafts can be electrically darkened, either for comfort of the occupants or for operational safety reasons, electrical power connections to the escape windows may already be available.

Returning now to FIG. 3, there is schematically shown a pair of SMA actuators 306, 306' arranged on either vertical side of frame 303 and configured to operate retractable pins 306, 306' when energized by an electric current. The electric current is in the illustrated example supplied by a battery 308 which is connected to supply electric current to both SMA actuators when an emergency release switch or button 310 is pressed. The SMA material then expands as a result of heating by the electric current, pushing the pins 306, 306' away from the frame 303 into the housing of the corresponding actuator. When the frame 303 is released from the pins 306, 306', i.e. when the pins 306, 306' retract from the respective openings or recesses in the frame 303, the window 302 which is still held inside the frame 303 by the gasket 304 can be pivoted outward or inward, or released completely, depending on the construction of the upper hinges 305, 305'.

It will be understood that the pull handles or pulling devices 206 shown in FIG. 2 may still be provided as a safety measure or to comply with government and/or aviation regulations to ensure that the escape window 302 can be pushed out or in should the emergency release using the proposed actuators 306, 306' fail.

Nickel-titanium (TiNi) alloys or copper-aluminum-nickel allows may be used in SMA actuators where large force and stroke are required and thermodynamic efficiency is not essential. SMA's offer exceptional high power density as mechanical actuators.

Because emergency release of an escape window need not be a reversible process, meaning that the emergency release is most likely due to a catastrophic event that may require substantial repairs on the aircraft, a separation device between the frame 303 and the fuselage 106 similar to a Frangibolt™ may be employed, wherein electric power heats the TiNi actuator cylinder, which then expands and elongates a notched bolt to fracture. This approach, which relies on fracture of a preloaded pin 306, 306', may result in a very reliable separation.

FIG. 4 shows another exemplary embodiment of an escape window 400 according to the present disclosure wherein the upper pins 305, 305' in FIG. 3 are replaced by SMA actuators 405, 405' of the type described above with reference to FIG. 4. All actuators 405, 405'; 406, 406' are here connected in parallel to battery 308 via emergency release buttons or switches 310, 310' likewise connected in parallel and arranged inside and outside the aircraft. Upon actuation and release of pins 405, 405'; 406, 406' between the frame 303 and the fuselage 106, the escape window can be jettisoned, leaving open for egress the entire unobstructed height $H_1$ (FIG. 3).

Figure 6:
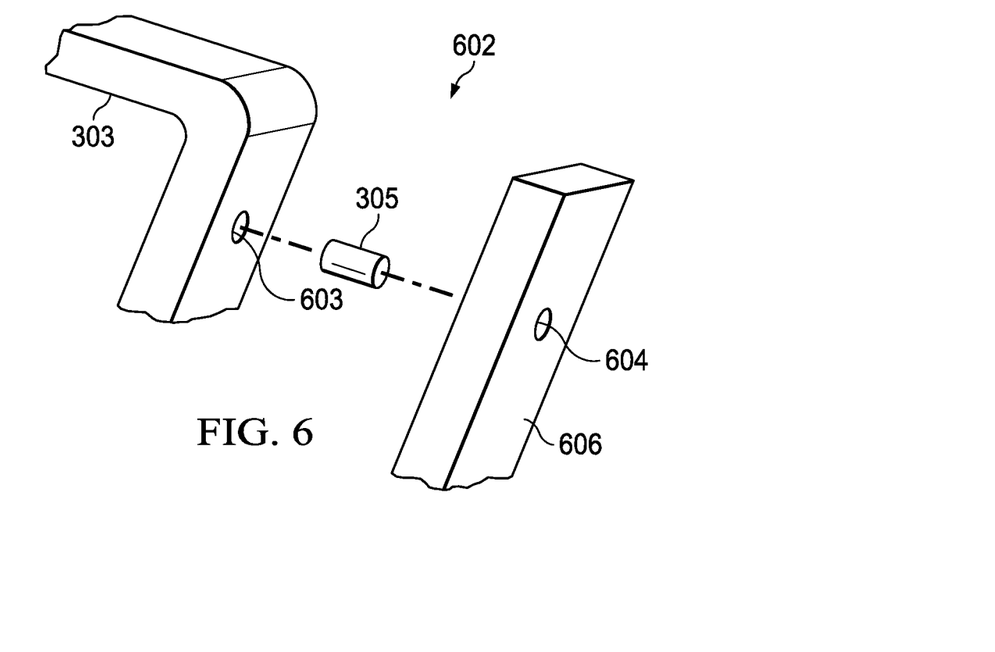
FIG. 6 shows schematically in a perspective view an example upper hinge of the escape push-out window assembly of FIG. 3 in a first embodiment.
Figure 7A:
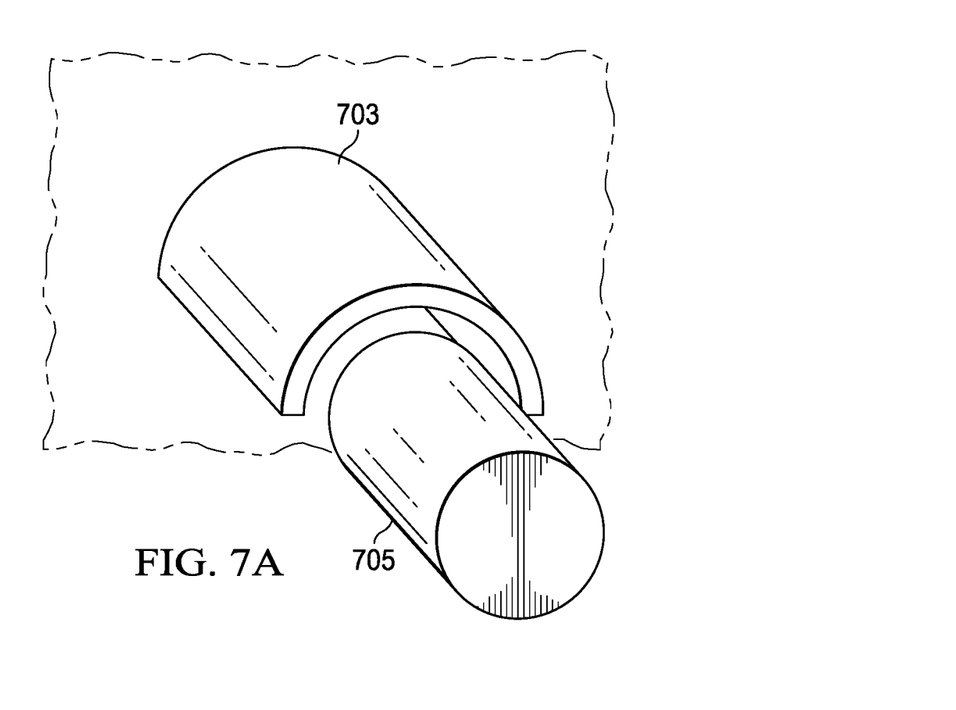
FIG. 7A shows schematically in a perspective view an example upper hinge of the escape push-out window assembly of FIG. 3 in a second embodiment
Figure 7B:
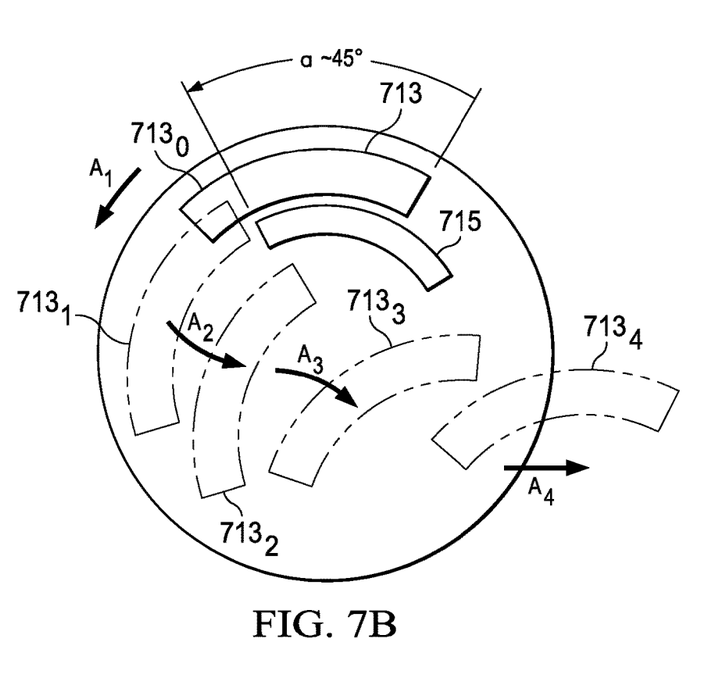
FIG. 7B shows schematically in a cross-sectional view the example upper hinge of FIG. 7A.

FIG. 6 schematically illustrates details of the attachment of the pivot pins 305, 305' described above with reference to FIG. 3. A hinge 602 has a pin 305 which is inserted into corresponding openings 603, 604 formed in the frame 303 and in the schematically indicated fuselage part 606, respectively. However, as discussed above with reference to FIG. 3, this would allow the escape window to be opened only to a reduced height $H_2$ and may not comply with FAA airworthiness regulations that the escape window must be able to be completely pushed in or out, and not merely opened. In an alternative embodiment of the frame support on the fuselage illustrated in FIG. 7A and FIG. 7B, the frame 303 may have a receptacle 703 which may be attached to or formed on a vertical side of the frame 303 and which may protrude slightly from the frame 303, allowing the receptacle 703 to rest and pivot on pin 705 with, as in FIG. 6, extends into the fuselage part 606. FIG. 7A shows this alternative embodiment schematically in a perspective view, with the pin 705 having a circular shape. Conversely, FIG. 7B illustrates in cross section a somewhat different embodiment, wherein the pin 715 is constructed as an arc-shaped top segment extending over a solid angle of, for example, between 30° and 60°, since only the arc-shaped top segment needs to support the cup-shaped receptacle 713 on pin 715 in the position $713_0$ where the frame 303 is secured in the fuselage 106. When the pins 306, 306' (FIG. 3) are retracted and released from the frame 303, the cup-shaped receptacle 713 is able to rotate about pin 715 in the direction of arrow $A_1$ where it can detach from the pin 715 at a position $713_1$. To clear the lower portion of the arc-shaped top segment of pin 715, the cup-shaped receptacle 713 may be further lowered to position $713_2$ along arrow $A_2$. The escape window may then be pushed to the right in FIG. 7B along arrow $A_3$ to position $713_3$ and further to position $713_4$ along arrow $A_4$. In position $713_4$ the window has substantially cleared the opening in the fuselage 106, which then allows the escape window to be pushed in or out, i.e. jettisoned, creating an escape path having the full unobstructed height $H_1$. The various positions and movements of the cup-shaped receptacle 713 and hence also of the attached frame and escape window in FIG. 7B are to be understood as representing only an example and various other embodiments able to achieve the same objective may be implemented.

Figure 4:
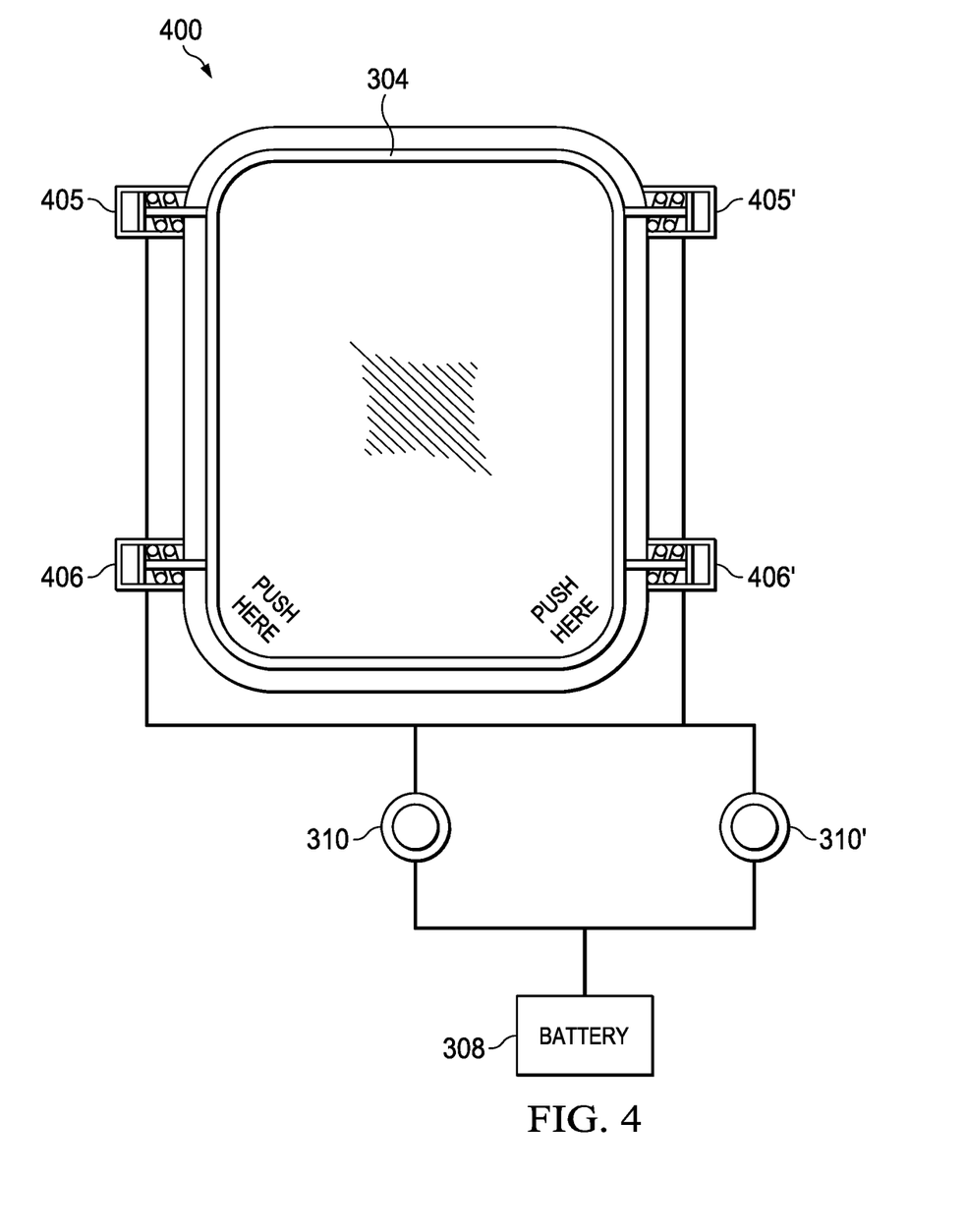
FIG. 4 illustrates a perspective view of an example escape push-out window assembly according to a further embodiment of the present disclosure.
Figure 5:
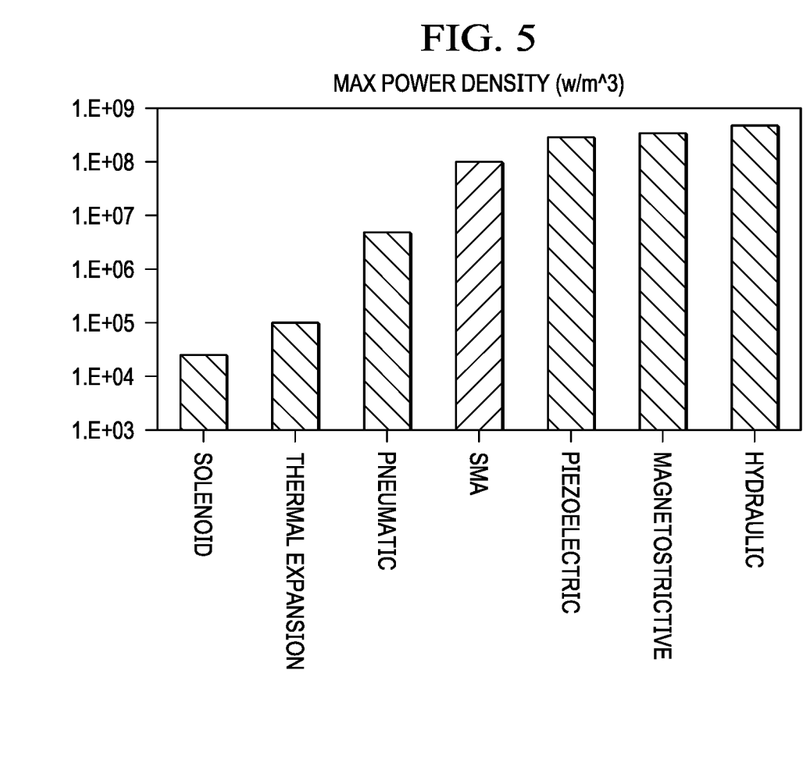
FIG. 5 shows a graph of the maximum power density achievable with various actuation mechanisms.

It will be understood that although the embodiments illustrated in FIGS. 3 and 4 have 2 and 4 actuators, respectively, other embodiments may be contemplated that have for example only one actuator installed for example at the bottom of the frame 303, or three or more than four actuators. Because SMA actuators are constructed to operate over a defined temperature range, depending on the material of the SMA, thermal insulation 309 (FIG. 3) from the environment or even active temperature management (heating/cooling of the actuator) may be implemented, depending on the expected temperature environment. However, the SMA activation temperature will generally be set above expected operational environmental temperature exposure.

Figure 8:
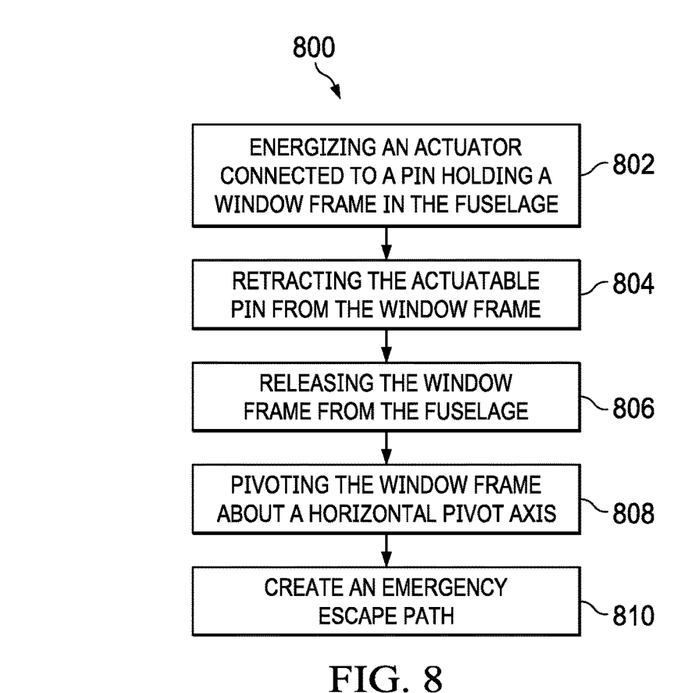
FIG. 8 is a process flow diagram of method for releasing an emergency escape window according embodiments of the present disclosure.

FIG. 8 illustrates in form of a process flow diagram a method for releasing an emergency escape window from a fuselage of a rotorcraft. The method 800 starts at step 802 where an actuator connected to a pin holding a window frame, with a window secured in the window frame, is energized, for example by power from an electric battery. This causes the pin to be retracted from the window frame, at step 804. The window frame with the window can then be released from the fuselage, at step 806. This is most effectively accomplished by pivoting the window frame about a horizontal pivot axis defined by two pins that are not actuated, at step 808. Opening the emergency escape window and/or detaching the emergency escape window from the fuselage then creates an emergency escape path, at step 810.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

What is claimed is:

1. An emergency escape window for a rotorcraft, comprising
   a window frame,
   a window pane secured in the window frame,
   a plurality of pins connecting the window frame to a fuselage of the rotorcraft, and
   a release mechanism comprising at least one actuator connected to an actuatable pin and constructed to retract the actuatable pin from the window frame, wherein two pins of the plurality of pins are non-actuatable pins arranged on an upper part of the window frame and defining a horizontal pivot axis, with each non-actuatable pin engaging in a respective opening or recess in the window frame and in a respective opening or recess the fuselage, enabling the window frame to pivot about the two non-actuatable pins about the horizontal pivot axis, wherein the opening or recess in the window frame is shaped as a circular arc extending over less than a half circle and rests on the corresponding non-actuatable pin constructed as an arc-shaped top segment extending over a solid angle of less than a half circle, allowing the window frame to be pivoted both inward and outward with respect to the fuselage and to completely detach from the fuselage upon retraction of the actuatable pin when the window frame is pivoted away from the fuselage part either inward or outward by a predetermined angle.

2. The emergency escape window of claim 1, wherein the actuator is a shape-memory-alloy (SMA) actuator.

3. The emergency escape window of claim 2, further comprising thermal insulation disposed around the SMA actuator to maintain the SMA actuator in a defined temperature operating range.

4. The emergency escape window of claim 2, wherein the actuator is energized by connecting a power source to the actuator.

5. The emergency escape window of claim 4, wherein the power source is a battery which is connected to the actuator by way of at least one switch.

6. The emergency escape window of claim 5, wherein the at least one switch is configured to be operated from inside the rotorcraft or from outside the rotorcraft, or both.

7. The emergency escape window of claim 1, wherein the actuator is selected from the group consisting of solenoid, thermal expansion, pneumatic, hydraulic, piezoelectric, and magnetostrictive actuators.

8. The emergency escape window of claim 1, wherein all pins of the plurality of pins are connected to respective actuators, and wherein the release mechanism operates to completely release the window frame from the fuselage.

9. The emergency escape window of claim 1, wherein the window pane is secured in the window frame by a gasket constructed to be pulled out by an occupant of the rotorcraft to release the window pane from the window frame.

10. The emergency escape window of claim 1, wherein the cup-shaped receptacle on the frame can be detached both inward and outward when the predetermined angle exceeds half the solid angle.

11. A method for releasing an emergency escape window from a fuselage of a rotorcraft, comprising:
    retracting at least one actuatable pin from a plurality of pins that secures a window frame of the emergency escape window in the fuselage by energizing a respective actuator connected to the at least one actuatable pin, releasing the window frame from the fuselage at least at a location where the at least one actuatable pin engages the window frame;

pivoting the window frame about two pins of the plurality of pins which are non-actuatable pins arranged on an upper part of the window frame and define a horizontal pivot axis, with each non-actuatable pin engaging in a respective opening or recess in the window frame and in a respective opening or recess the fuselage, wherein the opening or recess in the window frame is shaped as a circular arc extending over less than a half circle and rests on the corresponding non-actuatable pin constructed as an arc-shaped top segment extending over a solid angle of less than a half circle, so that the window frame can be pivoted both inward and outward with respect to the fuselage, and completely detaching the window frame from the fuselage upon retraction of the actuatable pin when the window frame is pivoted away from the fuselage part either inward or outward by a predetermined angle to create an emergency escape path.

12. The method of claim 11, wherein the respective actuator is a shape-memory-alloy (SMA) actuator, and wherein energizing comprises operating the respective SMA actuator from battery power by way of at least one switch and operating the at least one switch from inside or outside the rotorcraft, or both, in the event of an emergency.

13. The method of claim 11, wherein all pins of the plurality of pins are connected to respective actuators for retracting the pins from the window frame, and wherein the window frame can be completely detached from the fuselage upon actuation of the respective actuators.

14. The method of claim 11, wherein the cup-shaped receptacle on the frame can be detached both inward and outward when the predetermined angle exceeds half the solid angle.

15. A rotorcraft comprising:
a fuselage having at least one opening disposed on a side panel of the fuselage;
a window frame disposed in the at least one opening;
a window pane secured in the window frame;
a plurality of pins securing the window frame to the fuselage; and
a release mechanism comprising at least one actuator connected to an actuatable pin and constructed to retract the actuatable pin from the window frame, wherein two pins of the plurality of pins are non-actuatable pins arranged on an upper part of the window frame and defining a horizontal pivot axis, with each non-actuatable pin engaging in a respective opening or recess in the window frame and in a respective opening or recess the fuselage, enabling the window frame to pivot about the two non-actuatable pins about the horizontal pivot axis, wherein the opening or recess in the window frame is shaped as a circular arc extending over less than a half circle and rests on the corresponding non-actuatable pin constructed as an arc-shaped top segment extending over a solid angle of less than a half circle, allowing the window frame to be pivoted both inward and outward with respect to the fuselage and to completely detach from the fuselage upon retraction of the actuatable pin when the window frame is pivoted away from the fuselage part either inward or outward by a predetermined angle.

16. The rotorcraft of claim 15, wherein the actuator is a shape-memory-alloy (SMA) actuator that is actuatable by connecting battery power to the actuator via at least one switch configured to be operated from inside the rotorcraft or from outside the rotorcraft, or both.

17. The rotorcraft of claim 15, wherein all pins of the plurality of pins are connected to respective actuators, and wherein the release mechanism operates to completely release the window frame from the fuselage.

18. The rotorcraft of claim 15, wherein the cup-shaped receptacle on the frame can be detached both inward and outward when the predetermined angle exceeds half the solid angle.

* * * * *